US011959784B2

(12) United States Patent
Peterson et al.

(10) Patent No.: US 11,959,784 B2
(45) Date of Patent: Apr. 16, 2024

(54) BULK MATERIAL SENSING SYSTEM

(71) Applicant: Custom Agri Systems, Inc., Napoleon, OH (US)

(72) Inventors: Wesley Lynn Peterson, Indianapolis, IN (US); Daniel L. Burnette, Bringhurst, IN (US)

(73) Assignee: CUSTOM AGRI SYSTEMS, INC., Napoleon, OH (US)

( * ) Notice: Subject to any disclaimer, the term of this patent is extended or adjusted under 35 U.S.C. 154(b) by 45 days.

(21) Appl. No.: 17/485,898

(22) Filed: Sep. 27, 2021

(65) Prior Publication Data

US 2022/0099467 A1 Mar. 31, 2022

Related U.S. Application Data

(60) Provisional application No. 63/084,158, filed on Sep. 28, 2020.

(51) Int. Cl.
*G01F 1/58* (2006.01)
*G01F 15/14* (2006.01)

(52) U.S. Cl.
CPC ............... *G01F 1/58* (2013.01); *G01F 15/14* (2013.01)

(58) Field of Classification Search
CPC .................................. G01F 1/58; G01F 15/14
USPC ....................................................... 73/861.11
See application file for complete search history.

(56) References Cited

U.S. PATENT DOCUMENTS

| 3,426,595 | A | * | 2/1969 | Skelton | ............... G01F 1/07 73/198 |
| 4,630,489 | A | * | 12/1986 | Fisher | ............... G01F 1/06 73/861.87 |
| 6,088,929 | A | | 7/2000 | Watson et al. | |
| 6,141,886 | A | | 11/2000 | Watson et al. | |
| 6,367,336 | B1 | * | 4/2002 | Martina | ............... G01F 13/001 73/1.16 |
| 9,702,753 | B2 | | 7/2017 | Johnson et al. | |
| 10,390,484 | B2 | | 8/2019 | Baert et al. | |
| 2013/0014404 | A1 | | 1/2013 | Bloemendaal | |
| 2019/0082595 | A1 | | 3/2019 | Advani et al. | |
| 2019/0257581 | A1 | | 8/2019 | Wray et al. | |

FOREIGN PATENT DOCUMENTS

| CA | 2885751 A1 | 9/2016 |
| CN | 102749877 A | 10/2012 |
| JP | S61-044281 A | 3/1986 |
| JP | 2018061457 A | 4/2018 |

* cited by examiner

*Primary Examiner* — Nathaniel T Woodward
(74) *Attorney, Agent, or Firm* — Brenda J. Kruse; Shumaker, Loop & Kendrick, LLP

(57) ABSTRACT

A sensing system for a bulk material includes a housing, a sensor assembly at least partially disposed in the housing, and a controller in communication with the sensor assembly. The sensor assembly includes a flow member and an electromagnetic sensor configured to detect at least one parameter of the flow member. The controller is configured to determine at least one desired output based upon the at least one parameter of the flow member.

19 Claims, 15 Drawing Sheets

BULK MATERIAL SENSING SYSTEM

CROSS-REFERENCE TO RELATED APPLICATION

This application is entitled to claim the benefit of, and claims priority to, U.S. provisional patent application Ser. No. 63/084,158 filed Sep. 28, 2020, the entire disclosure of which is incorporated herein by reference.

FIELD

The presently disclosed subject matter relates to a sensing system, and more particularly to a sensing system for a bulk material.

BACKGROUND

Conventional sensing systems for monitoring a flow of a material are known in the prior art. However, the prior art systems are not able to monitor a flow of a compressed bulk material such as grain, for example. Being able to monitor the flow of grain is essential in a grain drying process.

In order to store grain for a long period of time, it is first necessary to dry the grain. Drying of the grain reduces an amount of water contained in the grain after harvest to an acceptable level for marketing, storage, or processing. Lowering the moisture content is necessary to prevent grain spoilage, which is primarily caused by molds and insect infestation. Both grain temperature and moisture content are critical in maintaining quality. Grain flow, or speed of the grain, through a grain dryer system may be controlled by various components thereof such as a speed of a loading feeder, a speed of metering rollers in a grain column, and a speed of a discharge mover, for example. The speed of the grain flow determines a retention time of the grain in a heating plenum section and a cooling plenum section. It is critical that the flow of the grain through the heating and cooling plenum sections be monitored to reach the desired moisture content yet avoid over-drying, which leads to stress cracks and breakage in the grain.

Accordingly, it would be desirable to produce a sensing system for a bulk material, which enhances durability, accuracy and manufacturability.

SUMMARY

In concordance and agreement with the present disclosure, a sensing system for a bulk material, which enhances durability, accuracy and manufacturability, has surprisingly been discovered.

In one embodiment, a sensor assembly for a bulk material handling system, comprises: a flow member; and an electromagnetic sensor disposed adjacent the flow member, wherein the electromagnetic sensor is configured to detect at least one parameter of at least one of the flow member and a material flowing at least one of over and adjacent the sensor assembly, wherein the sensor assembly is in communication with a controller configured to determine at least one desired output based upon the at least one parameter.

In another embodiment, a sensing system for a grain handling system, comprises: a housing; and a sensor assembly at least partially disposed in the housing, the sensor assembly including a flow member and a sensor, wherein the flow member is configured to be disposed adjacent a flow of a grain and the sensor is configured to detect at least one parameter of the flow member; and a controller in communication with the sensor assembly, wherein the controller is configured to determine at least one desired output based upon the at least one parameter of the flow member.

As aspects of certain embodiments, the flow member includes at least one sensing element coupled thereto.

As aspects of certain embodiments, the at least one sensing element is produced from a metal material.

As aspects of certain embodiments, the electromagnetic sensor at least one of detects and measures a change in an electromagnetic field resulting from a change in a position of the at least one sensing element in relation to the electromagnetic sensor.

As aspects of certain embodiments, the at least one parameter of the flow member is at least one of a movement and a rotational speed of the flow member.

As aspects of certain embodiments, the at least one desired output is at least one of a flow and a flow rate of the material.

As aspects of certain embodiments, the housing is formed by an upper wall, a lower wall, a front wall, a first side wall, and a second side wall, wherein the lower wall is positioned at an angle with respect to a plane defined by the upper wall.

As aspects of certain embodiments, the housing includes at least one opening configured to permit at least a portion of the grain collected in the housing to return back into the flow of the grain.

As aspects of certain embodiments, the housing includes at least one protuberance configured to direct at least a portion of the flow of the grain to flow at least one of over and adjacent at least a portion of the flow member.

As aspects of certain embodiments, the housing includes at least one protuberance configured to decrease a pressure surrounding the housing to draw out the grain collected in the housing.

As aspects of certain embodiments, the flow member is rotatably coupled to the housing.

As aspects of certain embodiments, at least a portion of the flow member extends into the flow of the grain.

In yet another embodiment, a method of detecting a flow of a bulk material, comprises: providing a sensing system including a sensor assembly and a controller in communication with the sensor assembly, wherein the sensor assembly includes a flow member and an electromagnetic sensor disposed adjacent the flow member; detecting, via the electromagnetic sensor, at least one parameter of the flow member; and determining, via the controller, at least one desired output based upon the at least one parameter of the flow member.

As aspects of certain embodiments, the method further comprising transmitting the at least one used desired output to a user.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION

Figure 1:
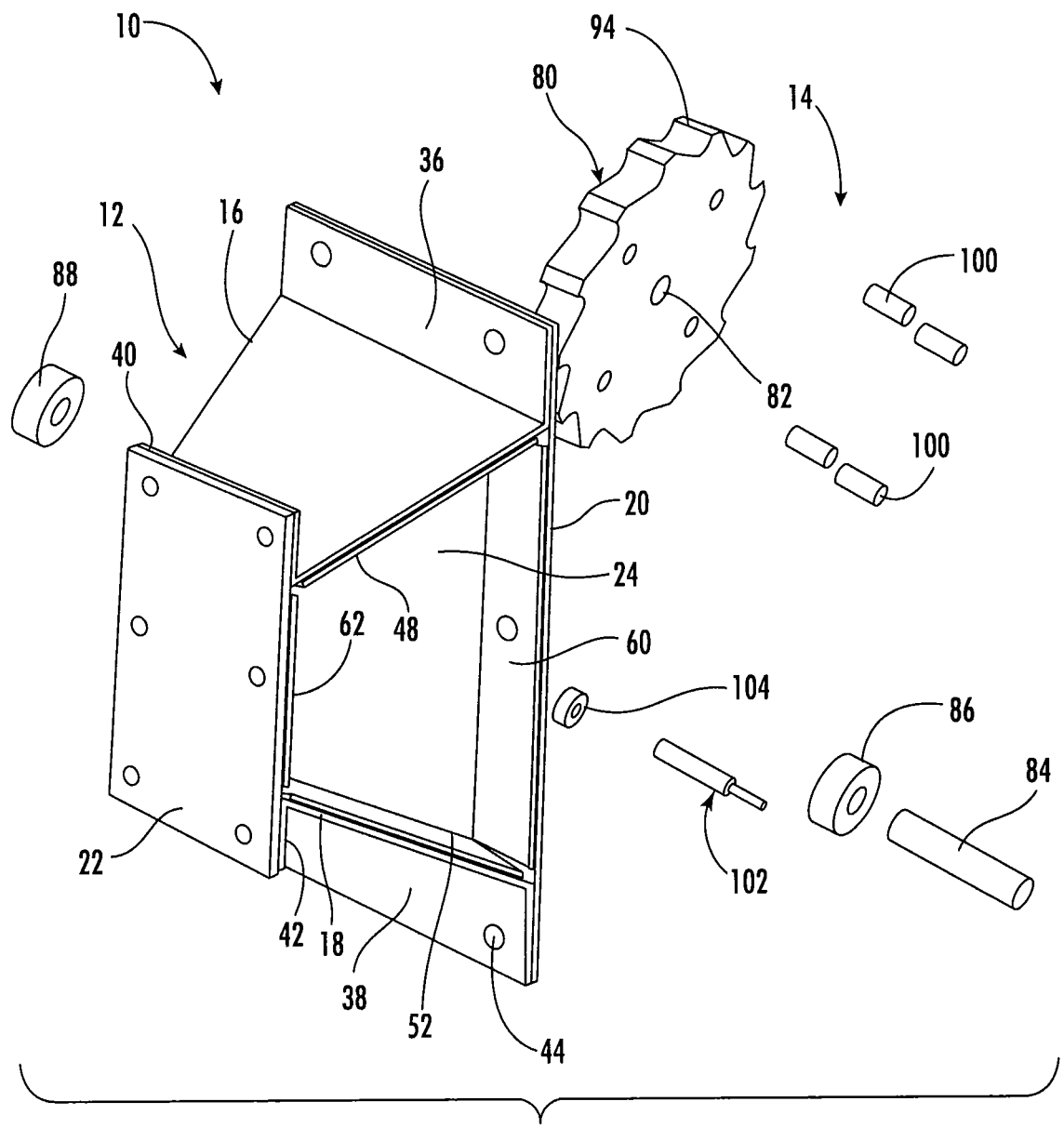
FIG. 1 is a partially exploded rear perspective view of a sensing system according to an embodiment of the presently described subject matter.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

FIGS. 1-9 illustrate a sensing system 10 according to an embodiment of the presently disclosed subject matter. The sensing system 10 may be preferably employed in sensing of a flow of a bulk material 2 through an enclosure, as shown in FIG. 17. In one embodiment, the sensing system 10 may include a hollow housing 12 defining a chamber 13, shown in FIG. 2, configured to receive a sensor assembly 14 therein. Various materials may be employed to produce the housing 12 as desired such as a metal material (e.g. steel, stainless steel, etc.), a non-metal material (e.g. plastic, etc.), or a combination thereof, for example. Although the housing 12 shown is a multi-piece component, it is understood that the housing 12 may be integrally formed as a unitary component, if desired. It should be appreciated that the housing 12 may be configured to be secured to a mounting structure by any suitable means as desired. As a non-limiting example, the housing 12 may include at least one through-hole (not depicted) formed therein which is configured to receive a fastener (not depicted) therein for securing the sensing system 10 to the mounting structure.

Figure 2:
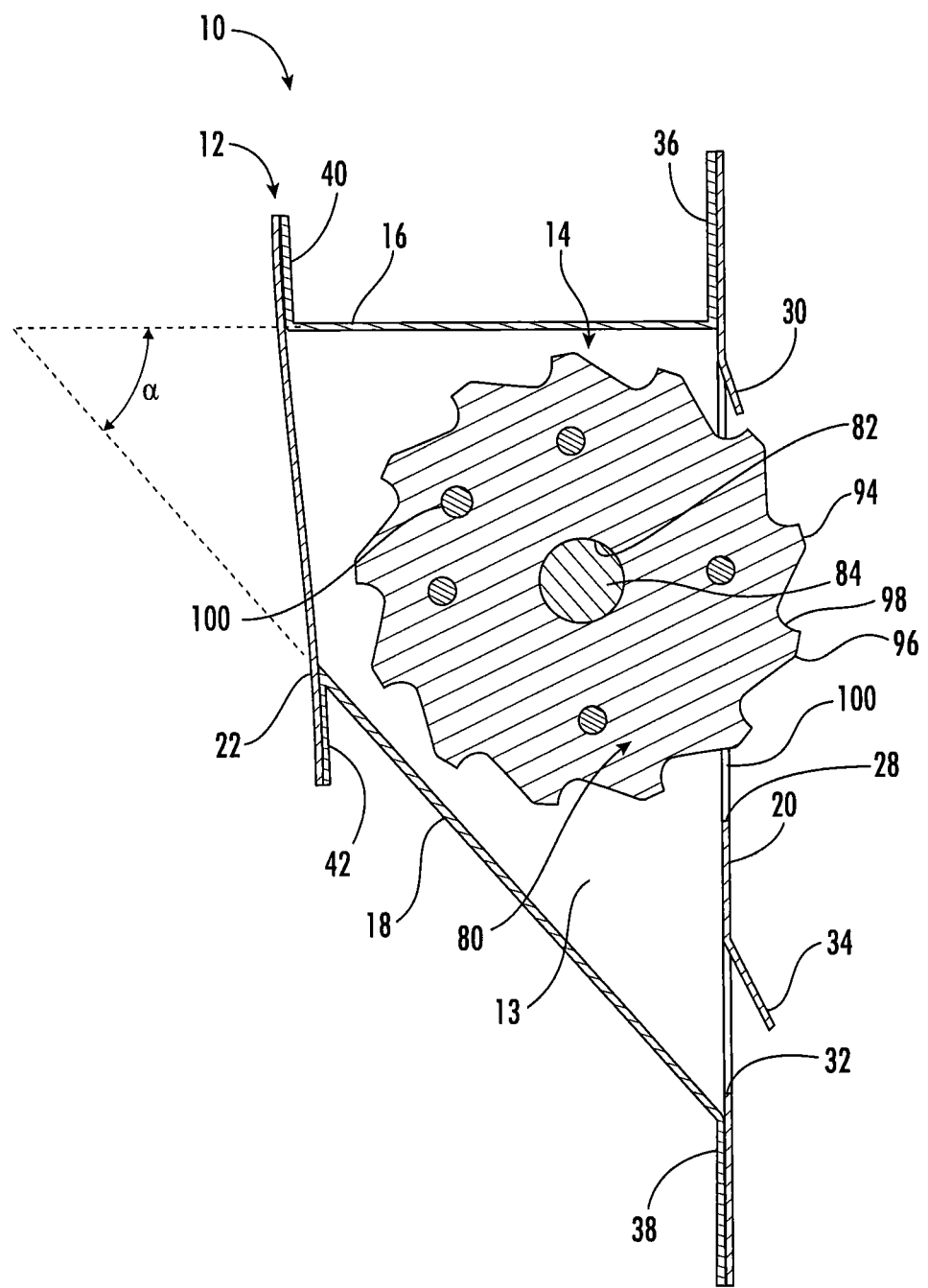
FIG. 2 is a left side cross-sectional view of the sensing system of FIG. 1.
Figure 3:
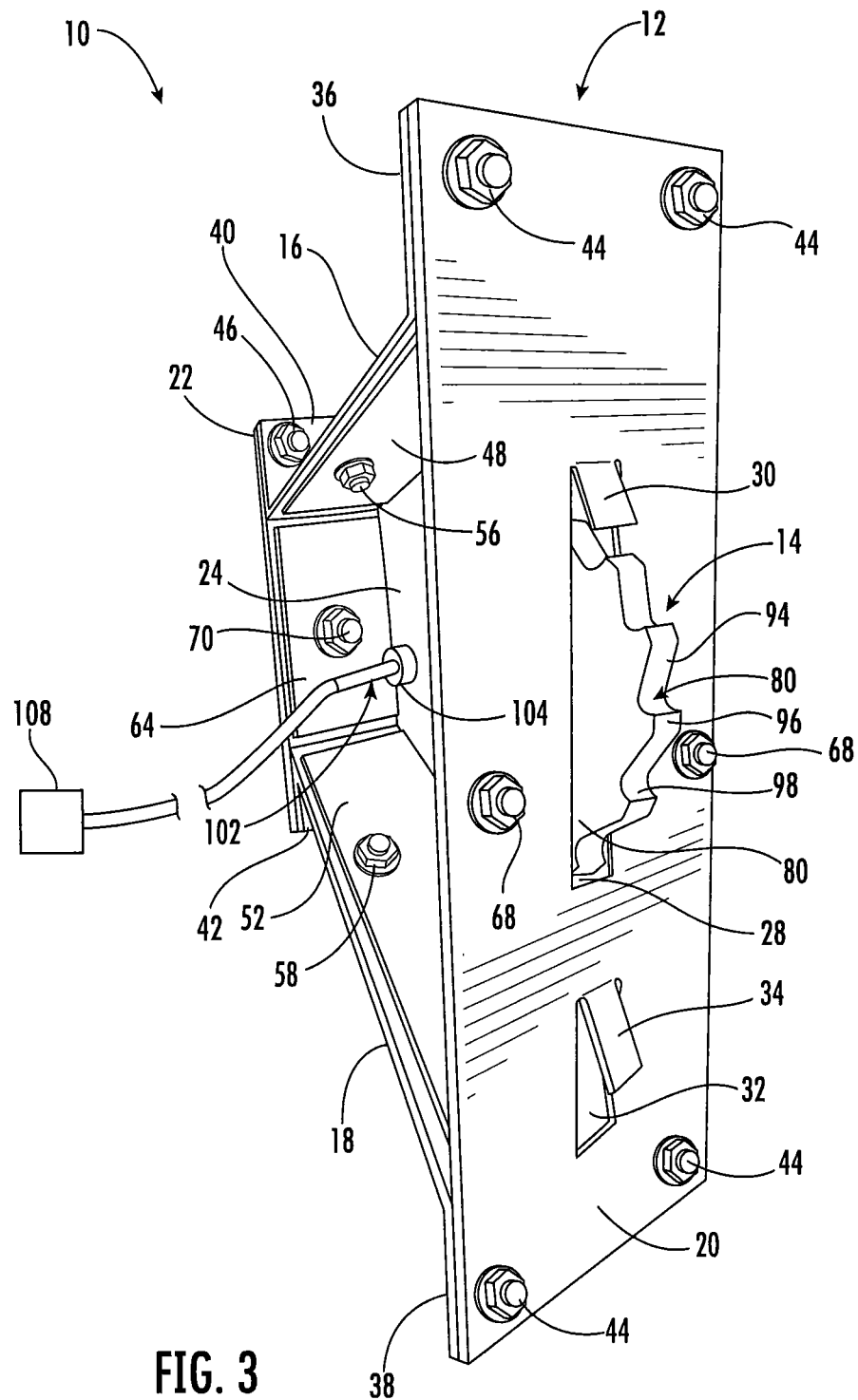
FIG. 3 is a front perspective view of the sensing system of FIGS. 1 and 2.
Figure 4:
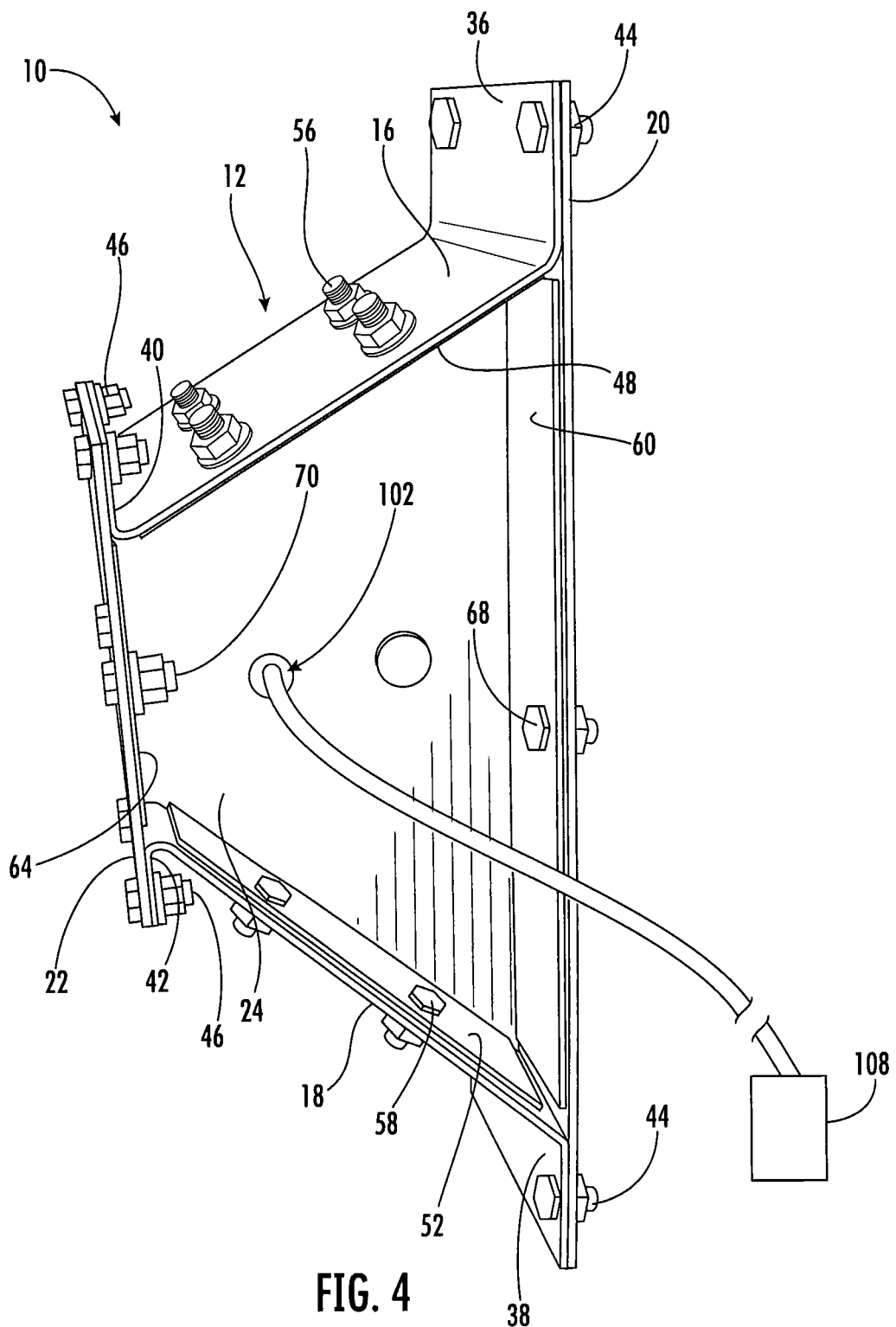
FIG. 4 is a left side perspective view of the sensing system of FIGS. 1-3.
Figure 5:
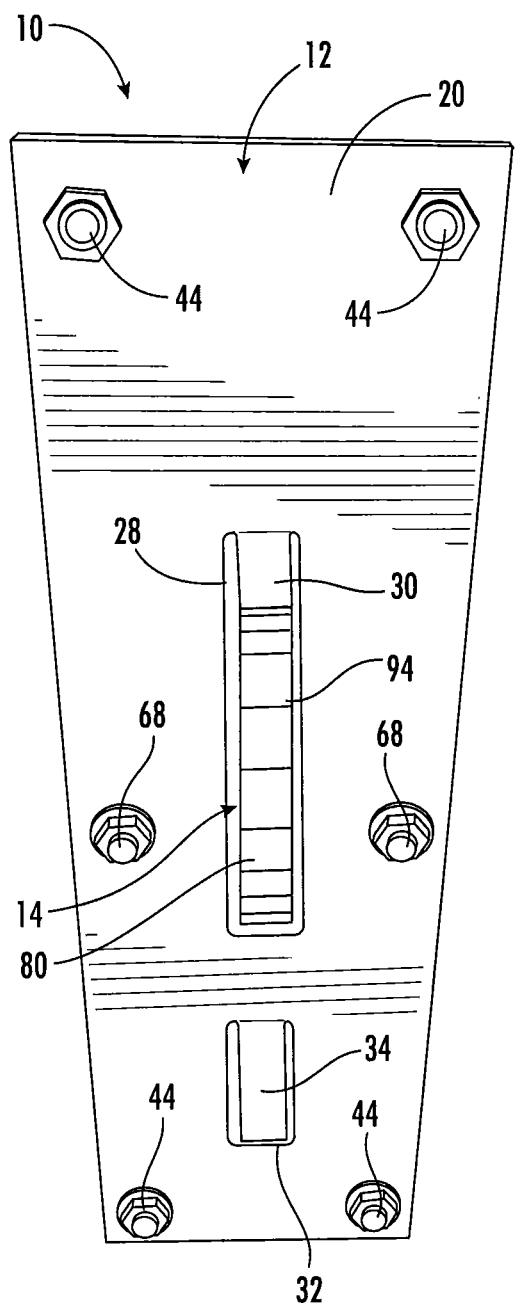
FIG. 5 is a top perspective view of the sensing system of FIGS. 1-4.
Figure 6:
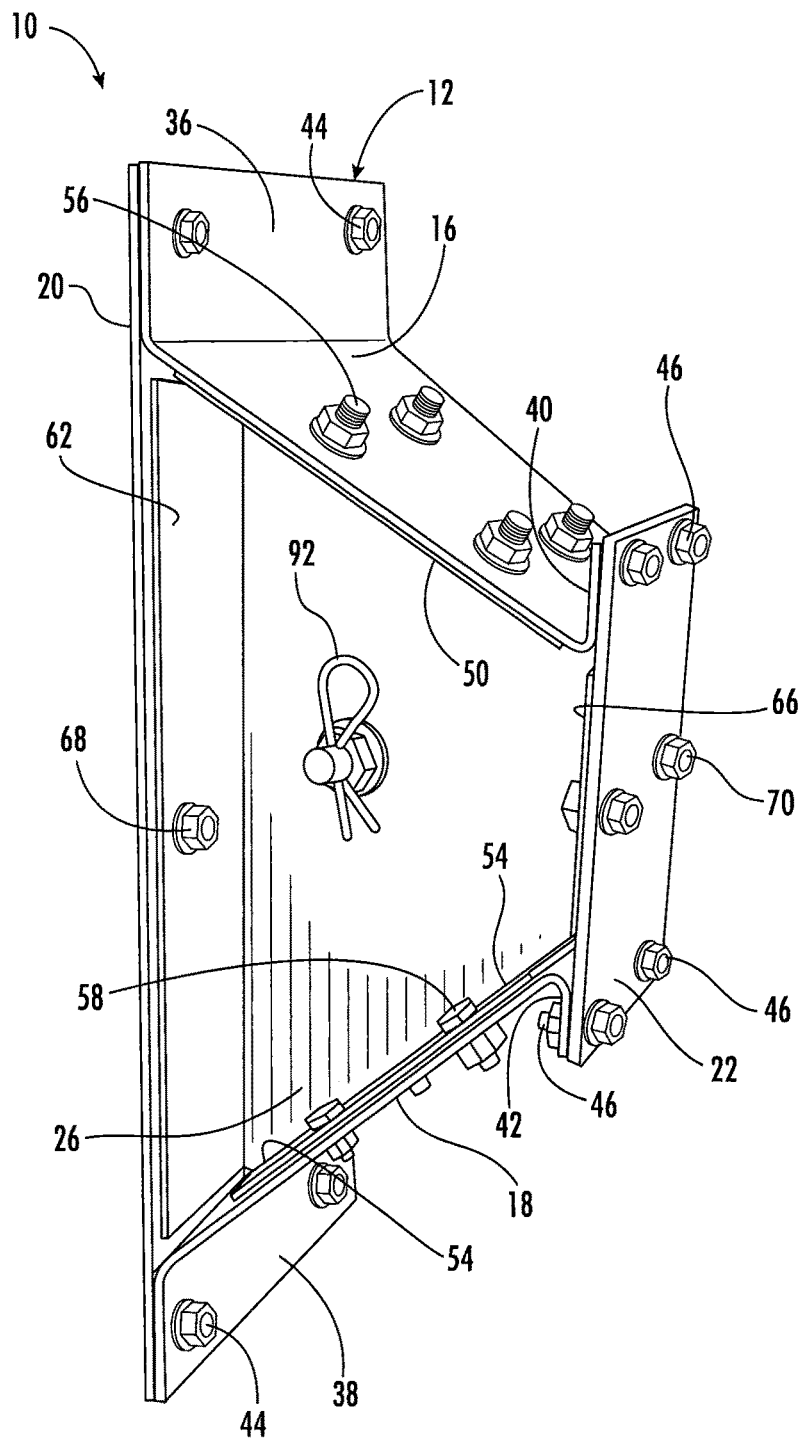
FIG. 6 is a right side perspective view of the sensing system of FIGS. 1-5.
Figure 7:
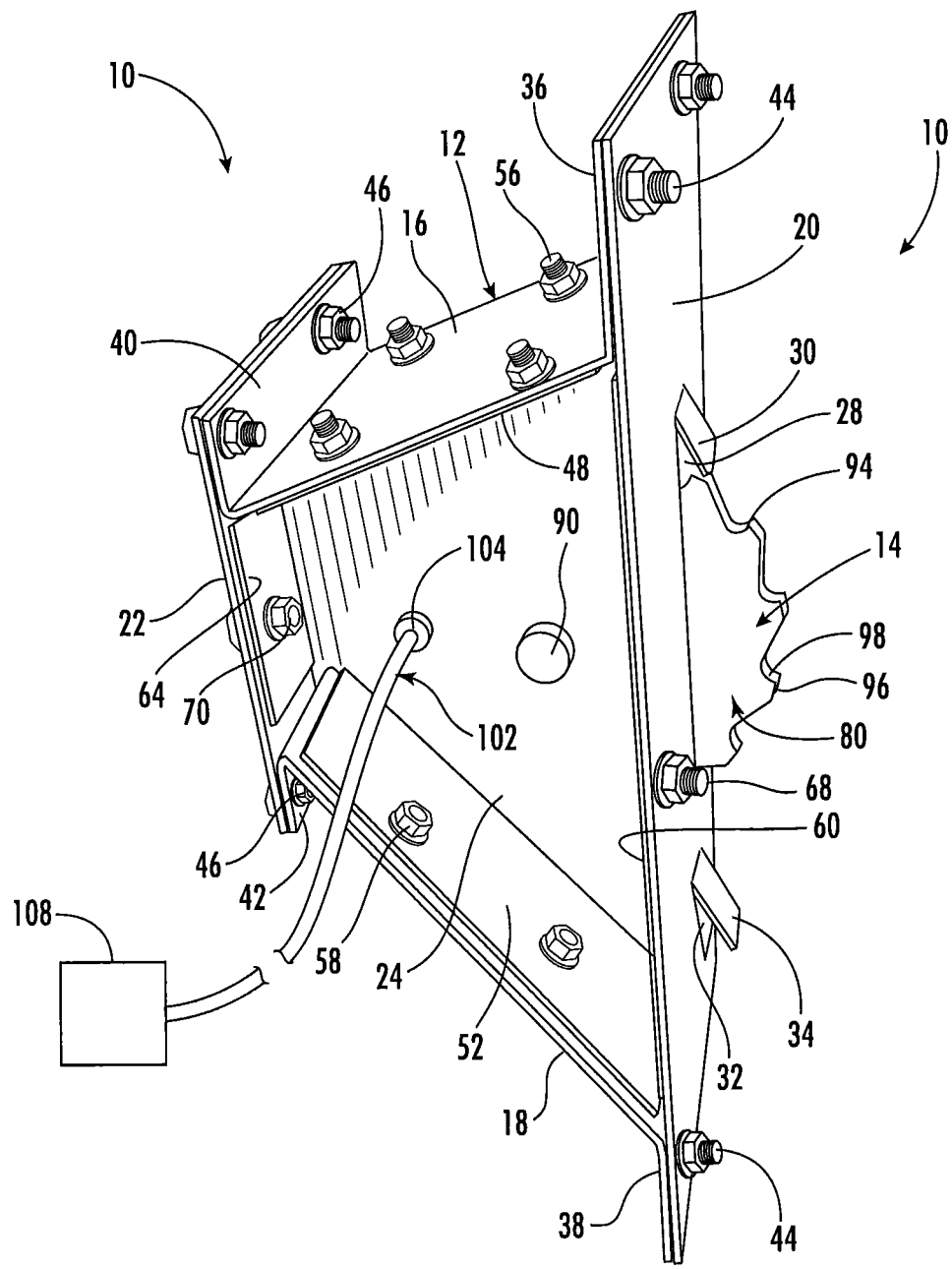
FIG. 7 is a left side perspective view of the sensing system of FIGS. 1-6.
Figure 8:
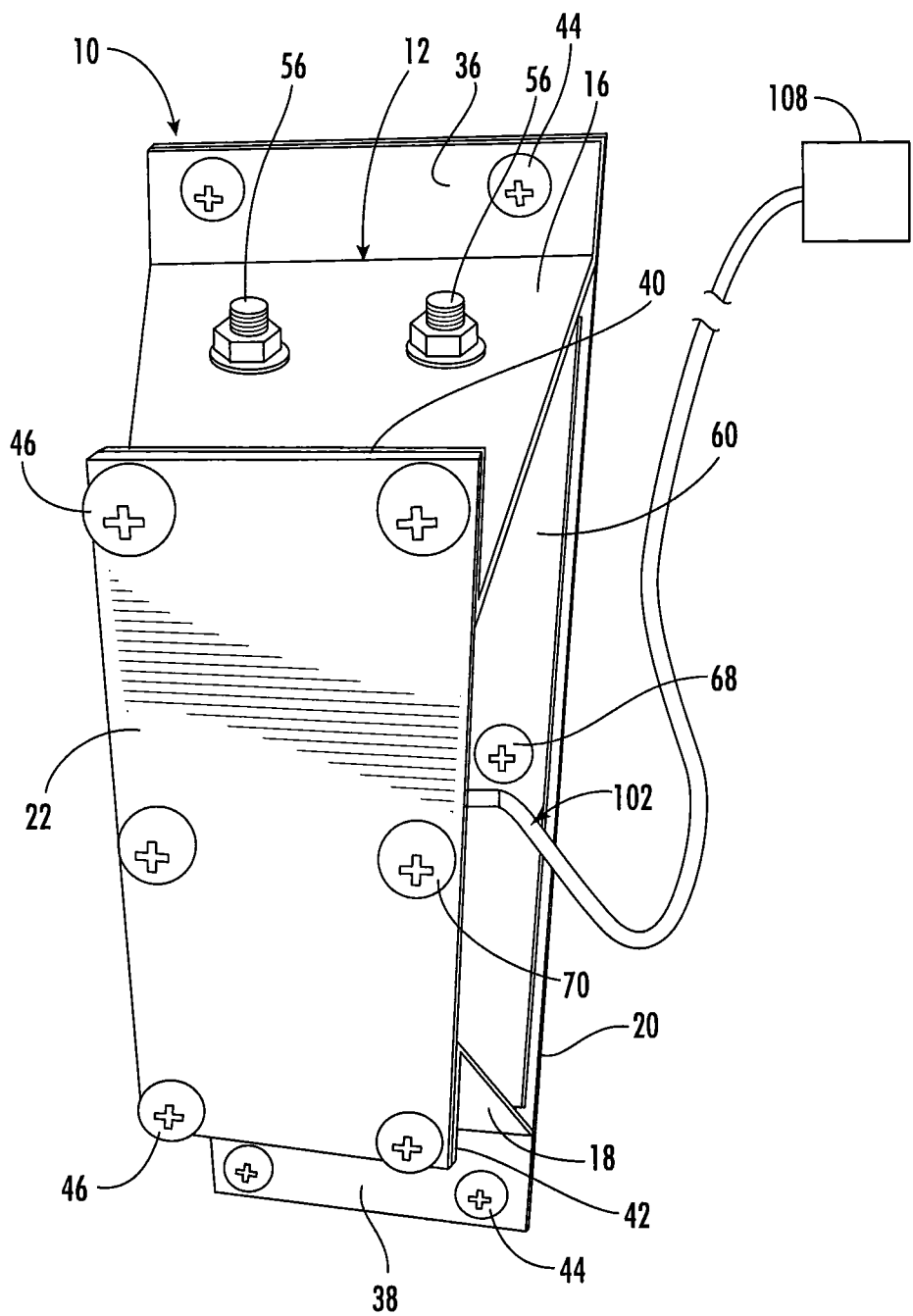
FIG. 8 is a rear view of the sensing system of FIGS. 1-7.
Figure 9:
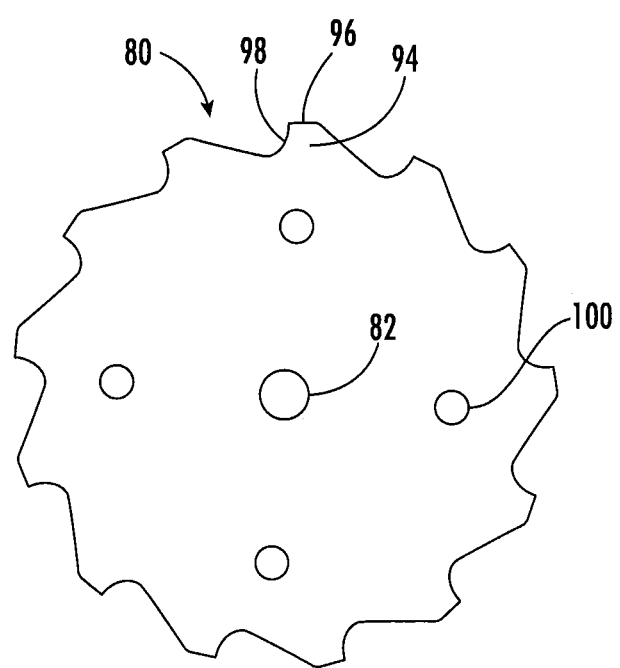
FIG. 9 is a flow member of the sensing system of FIGS. 1-8 according to an embodiment of the presently described subject matter.

As illustrated in FIG. 2, an embodiment of the housing 12 may comprise an upper wall 16, a lower wall 18, a front wall 20, a rear wall 22, a first side wall 24, and an opposing second side wall 26. As more clearly illustrated in FIG. 2, the upper wall 16 may be generally horizontal and the lower wall 18 may be sloped, curved, or positioned at angle α with respect to a plane defined by the upper wall 16. Preferably, the angle α may be in a range from about 0 degrees to 90 degrees in a clockwise direction. More preferably, the angle α may be about 45 degrees in the clockwise direction. It should be appreciated that the slope, curve, or angle α may be any slope, curve, or angle that facilitates a flow of the material 2 that collects within the chamber 13 out from the housing 12. The front wall 20 and the rear wall 22 may be generally vertical and positioned substantially parallel to each other. Similarly, the first and second side walls 24, 26 may be generally vertical and positioned substantially parallel to each other. The side walls 24, 26 may be positioned substantially perpendicular to the front and rear walls 20, 22 and the upper wall 16.

In one embodiment, the front wall 20 may include a first opening 28 for receiving a portion of the sensor assembly 14 therethrough. It is understood that the first opening 28 may have any shape and size as desired to allow enough of the sensor assembly 14 to extend into a stream of the material 2 flowing over and/or adjacent the sensing system 10. A first protuberance 30 may be disposed above and adjacent the first opening 28. The first protuberance 30 may be positioned with respect to the first opening 28 and may be configured to direct at least a portion of the stream of the material 2 to flow over at least a portion of the sensor assembly 14. In certain embodiments, the first protuberance 30 may be a tab portion projecting outward from the front wall 20.

A second opening 32 may be formed in the front wall 20 of the housing 12. It is understood that the second opening 32 may have any shape and size as desired to permit the material 2 collected in the chamber 13 to return back into the stream of the material 2 flowing over and/or adjacent the sensing system 10. A second protuberance 34 may be disposed above and adjacent the second opening 32. The second protuberance 34 may be positioned with respect to the second opening 32 and may be configured such that the stream of the material 2 flowing over and/or adjacent the sensing system 10 increases in velocity, thereby lowering a surrounding pressure, which causes a vacuum to draw the material 2 collected within the housing 12 out of the chamber 13 through the second opening 32. In certain embodiments, the second protuberance 34 may be a tab portion projecting outward from the front wall 20.

Each of the upper wall 16 and the lower wall 18 may include respective front flanges 36, 38 and respective rear flanges 40, 42 formed thereon. The front flanges 36, 38 may be configured to permit the upper wall 16 and the lower wall 18 to be coupled to the front wall 20 by at least one fastener 44 and the rear flanges 40, 42 may be configured to permit the upper wall 16 and the lower wall 18 to be coupled to the rear wall 22 by at least one fastener 46. Similarly, each of the first side wall 24 and the second side wall 26 may include respective upper flange 48, 50 and respective lower flange 52, 54. The upper flanges 48, 50 may be configured to permit the side walls 24, 26 to be coupled to the upper wall 16 by at least one fastener 56 and the lower flanges 52, 54 may be configured to permit the side walls 24, 26 to be coupled to the lower wall 18 by at least one fastener 58. Each of the side walls 24, 26 may further include respective front flanges 60, 62 and respective rear flanges 64, 66 formed thereon. The front flanges 60, 62 may be configured to permit the side walls 24, 26 to be coupled to the front wall 20 by at least one fastener 68 and the rear flanges 64, 66 may be configured to permit the side walls 24, 26 to be coupled to the rear wall 22 by at least one fastener 70.

In other embodiments, the walls 16, 18, 20, 22, 24, 26 may be coupled together by a welding process. In yet other embodiments, the walls 16, 18, 20, 22, 24, 26 may be integrally formed together by an injection molding process to produce a unitary one-piece housing 12. Various other forming methods may be employed to produce the unitary one-piece housing 12 such as blow molding, thermoforming, and the like, for example. It is understood that the walls 16, 18, 20, 22, 24, 26 may be coupled together in any configuration and by any suitable method, or combination thereof, as desired.

Figure 10:
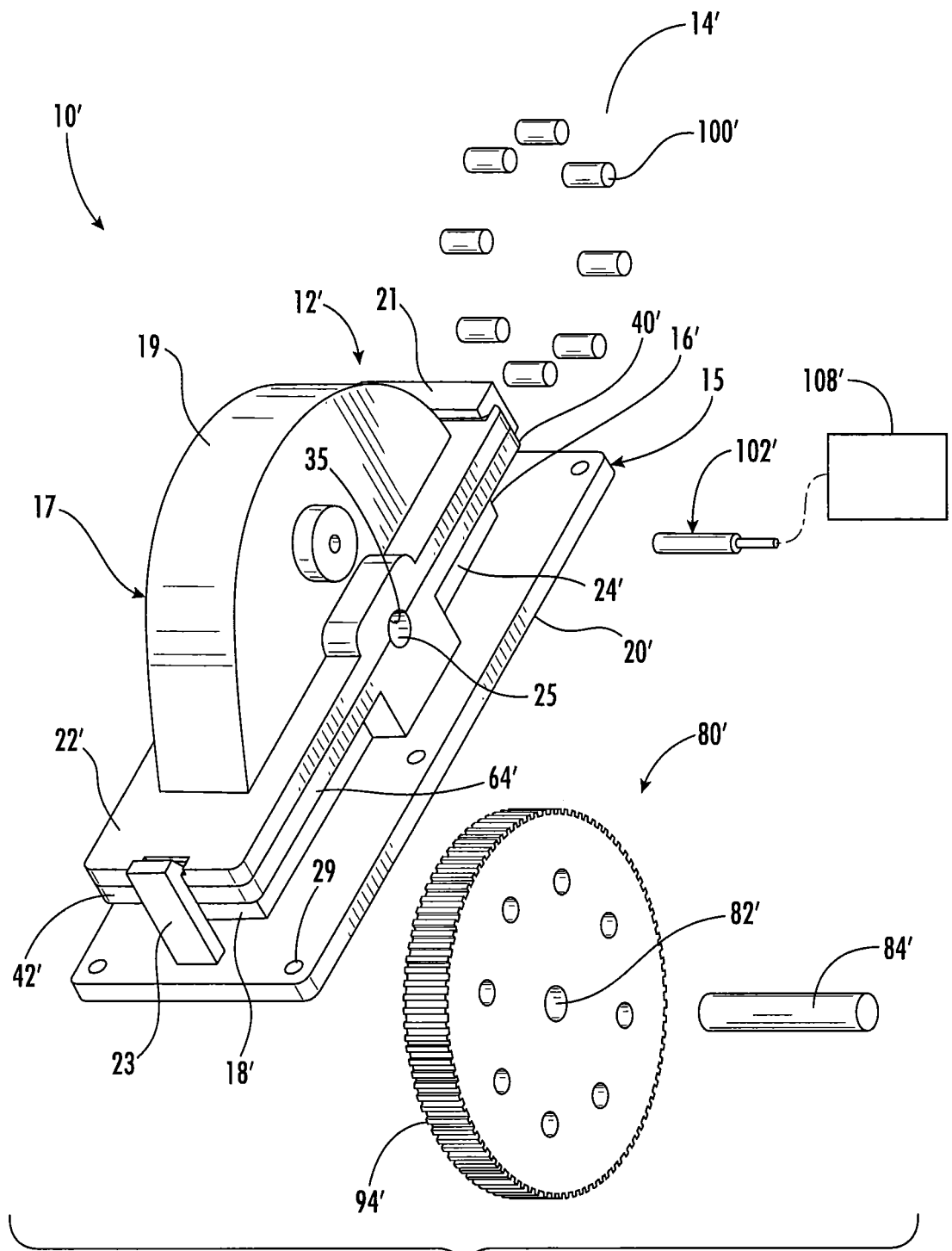
FIG. 10 is a partially exploded rear perspective view of a sensing system according to another embodiment of the presently described subject matter, wherein the sensing system includes a housing having a first housing portion and a second housing portion.

Referring back to FIG. 1, the sensor assembly 14 may include a flow member 80 rotatably coupled to the housing 12. It is understood that the flow member 80 may be rotatably coupled to the housing 12 by any suitable method as desired. Various materials may be employed to produce the flow member 80 as desired such as a metal material (e.g. steel, stainless steel, etc.), a non-metal material (e.g. plastic, etc.), or a combination thereof, for example. In one embodiment, the flow member 80, shown in FIG. 10, may be generally disc-shaped having a center bore 82 formed therein. An axle 84 may be received through the center bore 82 and coupled to the housing 12. As shown in FIG. 1, the axle 84 may be coupled to the side walls 24, 26 by respective locking collars 86, 88. In another embodiment shown in FIGS. 6 and 7, the axle 84 may include a head portion 90 formed on one end, which abuts one of the side walls 24, 26, and an opposing end of the axle 84 may be configured to receive a locking element 92 (i.e. a locking pin) for securing the axle 84 within the housing 12. In another embodiment, the axle 84 may be configured to be received and secured in the housing 12 by a snap connection. Various other methods may be employed to couple the axle 84 to the housing 12 such as mechanical fasteners (e.g. locking screws, snap rings, locking nuts, etc.), welds, epoxy, and the like, for example.

In certain embodiments, the flow member 80 may be rotatably coupled to the axle 84 which may be fixedly coupled to the housing 12, and in other embodiments, the flow member 80 may be fixedly coupled to the axle 84 which is rotatably coupled to the housing 12.

In certain embodiments, the flow member 80 may be partially disposed within the chamber 13 of the housing 12 having at least a portion thereof extending outward from the first opening 28 of the housing 12 and into the stream of the material 2. In some embodiments, a sealing element (not depicted) may be disposed in a surrounding space between the flow member 80 and the housing 12 to form a seal therebetween which militates against undesired material, including the material 2, and contaminants from entering the chamber 13 of the housing 12 instead of or in addition to employing the second opening 32 and the protuberance 34 formed in the housing 12.

An outer circumferential surface of the flow member 80 may include at least one surface feature 94 formed thereon. As illustrated, the flow member 80 includes an annular array of spaced apart surface features 94 formed on the outer circumferential surface. The surface features 94 may be configured to engage at least a portion of the stream of the material 2 flowing over and/or adjacent the sensing system 10. In one embodiment more clearly shown in FIG. 9, each of the surface features 94 may be an angled tooth element 96 having a shoulder portion 98 which engages the material 2, thereby causing a rotational movement of the flow member 80 about the axle 84 and/or within the housing 12. Various shapes, sizes, and configurations of the surface features 94 may be used as desired.

The sensor assembly 14 may further include at least one sensing element 100 coupled to the flow member 80. In one embodiment, the sensor assembly 14 may include an array of equally spaced apart sensing elements 100. Although the sensing elements 100 shown may be embedded in the flow member 80, it is understood that the sensing elements 100 may be disposed on, adjacent to, or in abutment with the flow member 80, if desired. In certain embodiments, the sensing elements 100 may be pins produced from a metal material (e.g. steel). Various other types of sensing elements 100 may be employed with the sensor assembly 14 if desired. More or less sensing elements 100 than shown may be employed in the sensor assembly 14.

Referring back to FIG. 1, the sensor assembly 14 may further include a sensor 102. The sensor 102 may be at least partially disposed within the chamber 13 of the housing 12. A locking element 104 may be employed to secure the sensor within the housing 12. It is understood that other suitable methods may be employed to secure the sensor 102 within the housing 12 as desired. The sensor 102 may be configured to detect and/or measure at least one parameter of the flow member 80 and/or the material 2 flowing over and/or adjacent to the sensing system 10. In one embodiment, the sensing system 10 shown may be configured to detect a movement and/or measure a rotational speed of the flow member 80, and thereby determine a flow and/or a flow rate of the material 2 flowing over and/or adjacent to the sensing system 10. If the sensing system 10 detects that the flow and/or the flow rate is below a predetermined level, the sensing system 10 may be configured to alert a user that a blockage or substantial impediment to the flow of the material 2 is present in the enclosure. In another embodiment, the sensing system 10 may be configured to count a number of pieces of the material 2 passing through the enclosure.

In one embodiment, the sensor 102 may be a proximity sensor configured to emit an electromagnetic field or a beam of electromagnetic radiation (e.g. infrared), and detects and/or measures changes in the electromagnetic field resulting from a change in a position of the sensing elements 100 in relation to the sensor 102 and transmits a signal representative of the at least one parameter of the flow member 80 and/or the material 2 flowing over and/or adjacent to the sensing system 10. It should be appreciated that the sensor assembly 14 may be another type of contact sensor assembly or a non-contact sensor assembly such as a sensor assembly employing an optical sensor, a capacitive proximity sensor, or a photoelectric sensor, for example. It is also understood that the sensor 102 may be able to detect and/or measure other parameters of the flow member 80 and/or the material 2 flowing over and/or adjacent to the sensing system 10 such as a temperature and/or a moisture content of the material 2, for example.

In certain embodiments, the sensor 102 may be in electrical communication with a controller 108 of the sensing system 10. A junction box or component (not depicted) may be employed to facilitate the electrical communication between the sensor 102 and the controller 108. Although the sensor 102 shown in FIGS. 1, 3-4 and 7-8 may be directly wired to the controller 108, it is understood that the sensor 102 may be in wireless communication with the controller 108 if desired. The controller 108 may be any type of controller 108 such as a microcontroller including a processor, for example. In one embodiment, the controller 108 may be configured to receive and process the signal from the sensor 102. The controller 108 may also be configured to communicate and/or transmit to a user at least one desired output such as the parameters of the flow member 80 and/or the material 2 flowing over and/or adjacent to the sensing system 10 (e.g. the movement and/or the rotational speed of the flow member 80), outputs determined from the parameters of the flow member 80 and/or the material 2 flowing over and/or adjacent to the sensing system 10 (e.g. the flow and/or the flow rate of the material 2 flowing over and/or adjacent to the sensing system 10), or any combination thereof, for example. Various means of communication may be employed by the controller 108 such as electronic, visual, and/or haptic communication, for example. In some embodiments, the controller 108 may be configured to communicate with an electric device of the user (i.e. a smartphone) to provide the at least one desired output to the user.

During operation of certain embodiments, the stream of material 2 flows over the flow member 80 causing it to rotate within the housing 12. As the flow member 80 rotates, a position of the sensing elements 100 in relation to the sensor 102 changes, essentially moving closer and away from the sensor 102, which affects the electromagnetic field provided by the sensor 102. The sensor 102 detects and/or measures the change in the electromagnetic field, which is indicative of the at least one parameter of the flow member 80 and/or the material 2 flowing over and/or adjacent to the sensing system 10. The sensor 102 then generates and transmits a signal representative of the at least one parameter of the flow member 80 and/or the material 2 flowing over and/or adjacent to the sensing system 10 to the controller 108. Using the signal received from the sensor 102, the controller 108 obtains the movement and/or the rotational speed of the flow member 80, which is then used to determine at least one desired output (e.g. the movement and/or flow rate of the material 2 flowing over and/or adjacent to the sensing system 10). The controller 108 then communicates and/or transmits the at least one desired output to the user.

Figure 11:
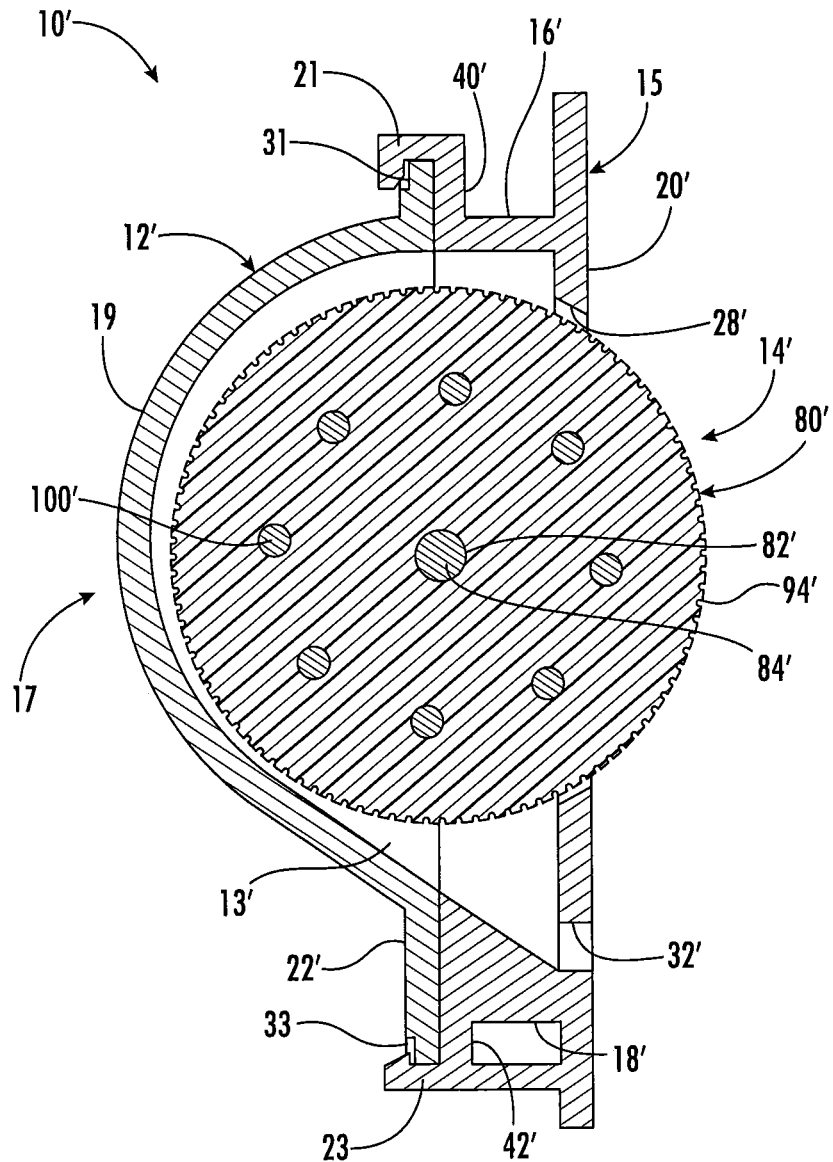
FIG. 11 is a left side cross-sectional view of the sensing system of FIG. 10.
Figure 12:
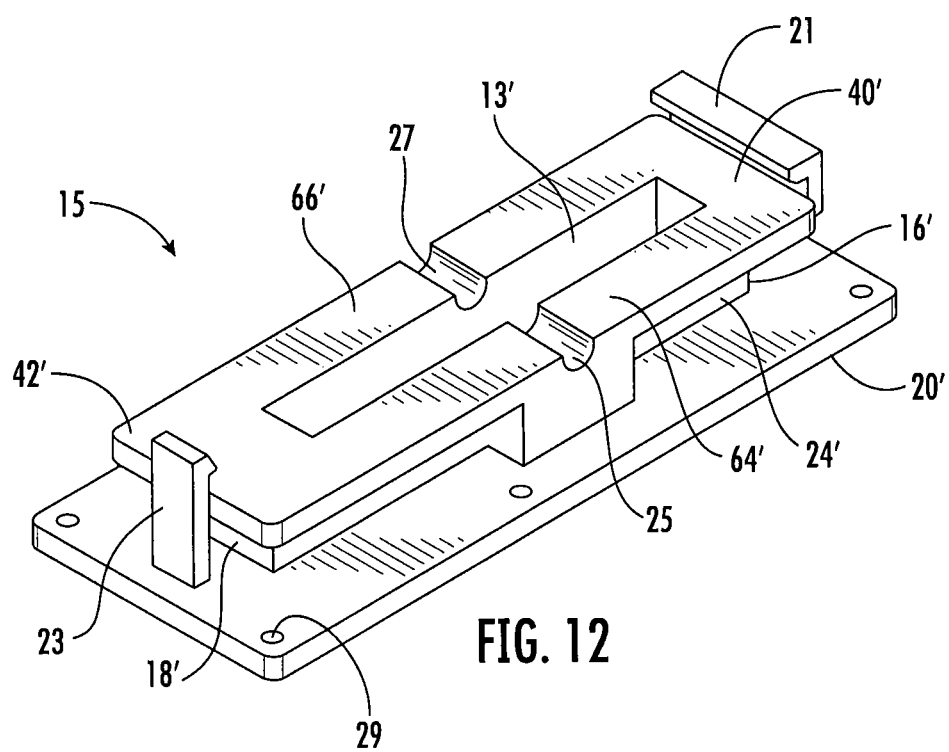
FIG. 12 is a rear perspective view of the first housing portion of the housing of the sensing system of FIGS. 10 and 11.
Figure 14:
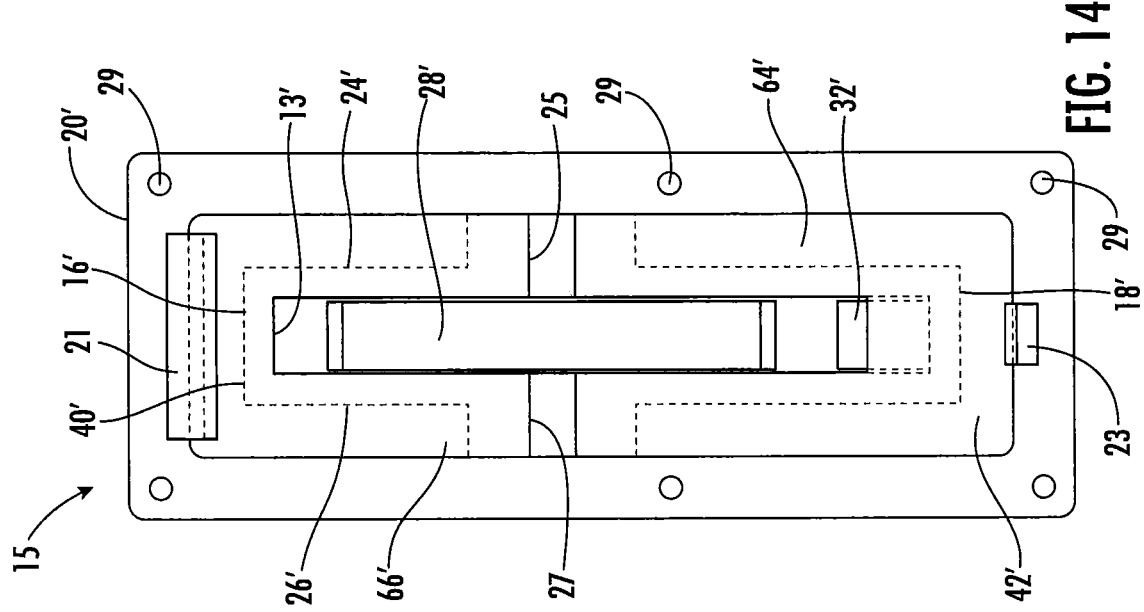
FIG. 14 is a rear elevational view of the first housing portion of the housing of FIGS. 12 and 13.
Figure 13:
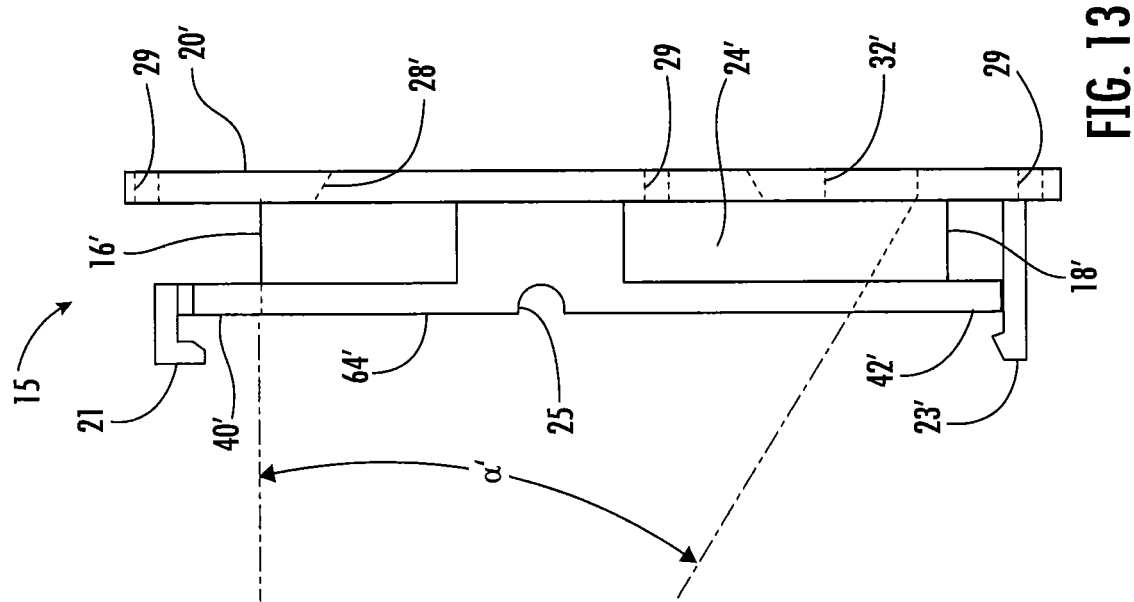
FIG. 13 is a left side elevational view of the first housing portion of the housing of FIG. 13.
Figure 15:
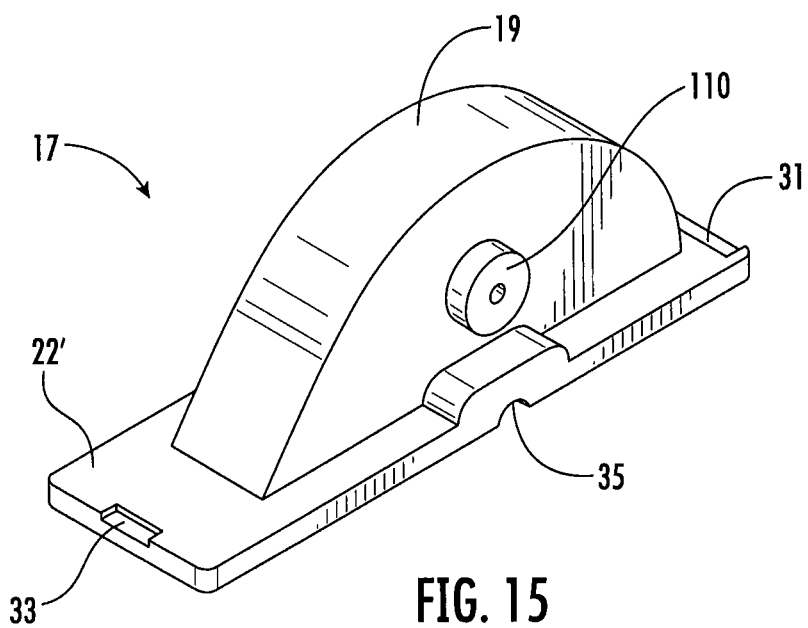
FIG. 15 is a rear perspective view of the second housing portion of the housing of the sensing system of FIGS. 10 and 11.
Figure 16:
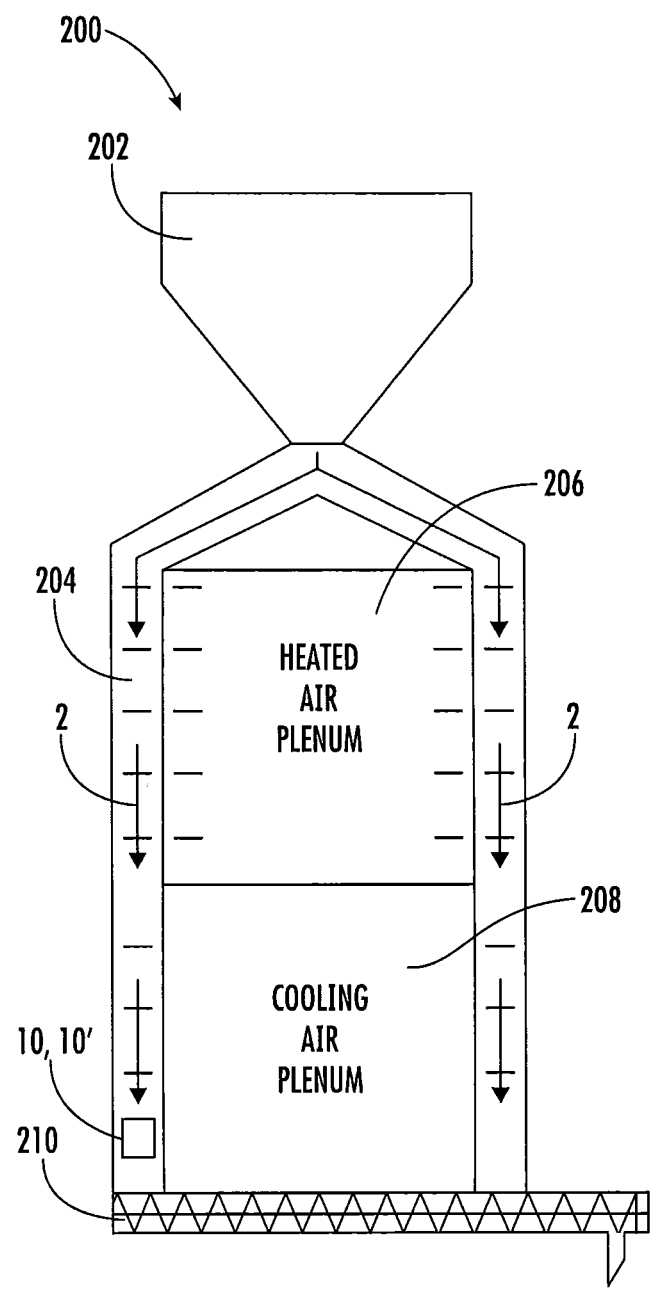
FIG. 16 is a schematic diagram of a grain dryer system including the sensing system of FIGS. 1-8 and 10-11 according to an embodiment of the presently described subject matter.

FIGS. 11-12 illustrate a sensing system 10' according to another embodiment of the presently disclosed subject matter wherein substantially similar elements to the sensing system 10 have the same identifying numerals except with the addition of a prime symbol suffix. The sensing system 10' may be preferably employed in sensing of the flow of the bulk material 2 through an enclosure. In one embodiment, the sensing system 10' may include a hollow housing 12' defining a chamber 13', shown in FIG. 12, configured to receive a sensor assembly 14' therein. Various materials may be employed to produce the housing 12' as desired such as a metal material (e.g. steel, stainless steel, etc.), a non-metal material (e.g. plastic, etc.), or a combination thereof, for example. Although the housing 12' shown is a two-piece component, it is understood that the housing 12' may be integrally formed as a unitary component, if desired.

In certain embodiments, the housing 12' may include a first housing portion 15 and a second housing portion 17. As more clearly illustrated in FIGS. 12-15, the first housing portion 15 may include an upper wall 16', a lower wall 18', a front wall 20', a first side wall 24', and an opposing second side wall 26'. The second housing portion 17 may include a rear wall 22' having an arcuate-shaped portion 19 rearwardly extending therefrom.

The upper wall 16' may be generally horizontal and the lower wall 18' may be sloped, curved, or positioned at angle α' with respect to a plane defined by the upper wall 16'. Preferably, the angle α' may be in a range from about 0 degrees to 90 degrees in a clockwise direction with respect to a plane defined by the upper wall 16'. More preferably, the angle α' may be about 45 degrees in the clockwise direction with respect to a plane defined by the upper wall 16'. It should be appreciated that the slope, curve, or angle α' may be any slope, curve, or angle that facilitates a flow of the material 2 that collects within the chamber 13' out from the housing 12'. The front wall 20' and the rear wall 22' may be generally vertical and positioned substantially parallel to each other. Similarly, the first and second side walls 24', 26' may be generally vertical and positioned substantially parallel to each other. The side walls 24', 26' may be positioned substantially perpendicular to the front and rear walls 20', 22' and the upper wall 16'.

In one embodiment, the front wall 20' may include a first opening 28' for receiving a portion of the sensor assembly 14' therethrough. It is understood that the first opening 28' may have any shape and size as desired to allow enough of the sensor assembly 14' to extend into a stream of the material 2 flowing over and/or adjacent the sensing system 10'. A first protuberance (not depicted) may be disposed above and adjacent the first opening 28'. The first protuberance may be positioned with respect to the first opening 28' and may be configured to direct at least a portion of the stream of the material 2 to flow over at least a portion of the sensor assembly 14'. In certain embodiments, the first protuberance may be a tab portion projecting outward from the front wall 20'.

A second opening 32' may be formed in the front wall 20' of the housing 12'. It is understood that the second opening 32' may have any shape and size as desired to permit the material 2 collected in the chamber 13' to return back into the stream of the material 2 flowing over and/or adjacent the sensing system 10'. A second protuberance (not depicted) may be disposed above and adjacent the second opening 32'. The second protuberance may be positioned with respect to the second opening 32' and may be configured such that the stream of the material 2 flowing over and/or adjacent the sensing system 10' increases in velocity, thereby lowering a surrounding pressure, which causes a vacuum to draw the material 2 collected within the housing 12' out of the chamber 13' through the second opening 32'. In certain embodiments, the second protuberance may be a tab portion projecting outward from the front wall 20'.

In certain embodiments, the front wall 20' may further include at least one throughhole 29 formed therein which is configured to receive a fastener (not depicted) therein for securing the sensing system 10' to a mounting structure (not depicted). It should be appreciated that the sensing system 10' may be secured to the mounting structure by any suitable means as desired.

Each of the upper wall 16' and the lower wall 18' shown may be integrally formed with the front wall 20' and include respective rear flanges 40', 42' formed thereon. The rear flanges 40', 42' may be configured to permit the upper wall 16' and the lower wall 18' to be coupled to the rear wall 22'. Similarly, each of the side walls 24', 26' may include respective rear flanges 64', 66' formed thereon. The rear flanges 64', 66' may be configured to permit the side walls 24', 26' to be coupled to the rear wall 22'. Each of the rear flanges 64′, 66′ may include a respective one of semi-circular shaped detents 25, 27 laterally extending from an outer edge to an inner edge of the rear flanges 64′, 66′.

As shown in FIGS. 10-14, the rear flanges 40′, 42′, 64′, 66′ may be integrally formed together and with the respective one of the walls 16′, 18′, 24′, 26′. In certain embodiments, the rear flange 40′ may further include a first coupling element 21 and the front wall 20′ may include a second coupling element 23 formed thereon. As shown, the first coupling element 21 may be integrally formed with the rear flange 40′ and the second coupling element 23 may be integrally formed with the front wall 20′. Although the walls 16′, 18′, 20′, 24′, 26′, the flanges 40′, 42′, 64′, 66′, and the coupling elements 21, 23 may be formed as a unitary, single piece component, it is understood that at least one of the walls 16′, 18′, 20′, 24′, 26′, the flanges 40′, 42′, 64′, 66′, and the coupling elements 21, 23 may be formed as separate and distinct components, if desired. Various forming methods may be employed to produce the unitary one-piece first housing portion 15 such as injection molding, blow molding, thermoforming, and the like, for example. In other embodiments, the walls 16′, 18′, 20′, 24′, 26′, the flanges 40′, 42′, 64′, 66′, and the coupling elements 21, 23 may be coupled together by a welding process. It is understood that the walls 16′, 18′, 20′, 24′, 26′, the flanges 40′, 42′, 64′, 66′, and the coupling elements 21, 23 may be coupled together in any configuration and by any suitable method, or combination thereof, as desired.

In certain embodiments, the rear wall 22′ may include a first indentation 31 and a second indentation 33 formed in an outer surface thereof. As more clearly shown in FIGS. 10 and 11, the first and second indentations 31, 33 are configured to cooperate with the first and second coupling elements 21, 23, respectively, to secure the second housing portion 17 to the first housing portion 15. It is understood that the first and second housing portions 15, 17 may be coupled together by any suitable method as desired such as employing the use of fasteners, epoxy, and the like, for example. The rear wall 22′ may further include semi-circular shaped detents 35 laterally extending from an outer edge to an inner edge of an inner surface of the rear wall 22′. The detents 35 of the second housing portion 17 may be configured to align and correspond with the detents 25, 27 of the first housing portion 15 to form a center bore through the housing 12′.

Referring back to FIGS. 10 and 11, the sensor assembly 14′ may include a flow member 80′ rotatably coupled to the housing 12′. It is understood that the flow member 80′ may be rotatably coupled to the housing 12′ by any suitable method as desired. Various materials may be employed to produce the flow member 80′ as desired such as a metal material (e.g. steel, stainless steel, etc.), a non-metal material (e.g. plastic, etc.), or a combination thereof, for example. In one embodiment, the flow member 80′ may be generally disc-shaped having a center bore 82′ formed therein. An axle 84′ may be received through the center bore of the housing 12′ and the center bore 82′ of the flow member 80′ and coupled to the housing 12′. In the embodiment shown, the axle 84′ may be configured to be received and secured in the detents 25, 27, 35 formed in the first and second housing portions 15, 17. In another embodiment, the axle 84′ may be coupled to the side walls 24′, 26′ by respective locking collars. In yet another embodiment, the axle 84′ may include a head portion formed on one end, which abuts one of the side walls 24′, 26′, and an opposing end of the axle 84′ may be configured to receive a locking element (i.e. a locking pin) for securing the axle 84′ within the housing 12′. Various other methods may be employed to couple the axle 84′ to the housing 12′ such as mechanical fasteners (e.g. locking screws, snap rings, locking nuts, etc.), welds, epoxy, and the like, for example.

In certain embodiments, the flow member 80′ may be rotatably coupled to the axle 84′ which may be fixedly coupled to the housing 12′, and in other embodiments, the flow member 80′ may be fixedly coupled to the axle 84′ which is rotatably coupled to the housing 12′.

In certain embodiments, the flow member 80′ may be partially disposed within the chamber 13′ of the housing 12′ having at least a portion thereof extending outward from the first opening 28′ of the housing 12′ and into the stream of the material 2. In some embodiments, a sealing element (not depicted) may be disposed in a surrounding space between the flow member 80′ and the housing 12′ to form a seal therebetween which militates against undesired material, including the material 2, and contaminants from entering the chamber 13′ of the housing 12′ instead of or in addition to employing the second opening 32′ and the protuberance 34′ formed in the housing 12′.

An outer circumferential surface of the flow member 80′ may include at least one surface feature 94′ formed thereon. As illustrated, the flow member 80′ includes an annular array of spaced apart surface features 94′ formed on the outer circumferential surface. The surface features 94′ may be configured to engage at least a portion of the stream of the material 2 flowing over and/or adjacent the sensing system 10′. In one embodiment, each of the surface features 94′ may be an angled tooth element having a shoulder portion which engages the material 2, thereby causing a rotational movement of the flow member 80′ about the axle 84′ and/or within the housing 12′. Various shapes, sizes, and configurations of the surface features 94′ may be used as desired.

The sensor assembly 14′ may further include at least one sensing element 100′ coupled to the flow member 80′. In one embodiment, the sensor assembly 14′ may include an array of equally spaced apart sensing elements 100′. Although the sensing elements 100′ shown may be embedded in the flow member 80′, it is understood that the sensing elements 100′ may be disposed on, adjacent to, or in abutment with the flow member 80′, if desired. In certain embodiments, the sensing elements 100′ may be pins produced from a metal material (e.g. steel). Various other types of sensing elements 100′ may be employed with the sensor assembly 14′ if desired. More or less sensing elements 100′ than shown may be employed in the sensor assembly 14′.

Referring back to FIG. 10, the sensor assembly 14′ may further include a sensor 102′. The sensor 102′ may be at least partially disposed within the chamber 13′ of the housing 12′. In certain embodiments, the sensor 102′ is disposed through a boss 110 formed in the arcuate-shaped portion 19. A locking element 104′ may be employed to secure the sensor within the housing 12′. It is understood that other suitable methods may be employed to secure the sensor 102′ within the housing 12′ as desired. The sensor 102′ may be configured to detect and/or measure at least one parameter of the flow member 80′ and/or the material 2 flowing over and/or adjacent to the sensing system 10′. In one embodiment, the sensing system 10′ shown may be configured to detect a movement and/or measure a rotational speed of the flow member 80′, and thereby determine a flow and/or a flow rate of the material 2 flowing over and/or adjacent to the sensing system 10′. If the sensing system 10′ detects that the flow and/or the flow rate of the material 2 is below a predetermined level, the sensing system 10′ may be configured to alert a user that a blockage or substantial impediment to the flow of the material 2 is present in the enclosure. In another embodiment, the sensing system 10' may be configured to count a number of pieces of the material 2 passing through the enclosure.

In one embodiment, the sensor 102' may be a proximity sensor configured to emit an electromagnetic field or a beam of electromagnetic radiation (e.g. infrared), and detects and/or measures changes in the electromagnetic field resulting from a change in a position of the sensing elements 100' in relation to the sensor 102' and transmits a signal representative of the at least one parameter of the flow member 80' and/or the material 2 flowing over and/or adjacent to the sensing system 10'. It should be appreciated that the sensor assembly 14' may be another type of contact sensor assembly or a non-contact sensor assembly such as a sensor assembly employing an optical sensor, a capacitive proximity sensor, or a photoelectric sensor, for example. It is also understood that the sensor 102' may be able to detect and/or measure other parameters of the flow member 80' and/or the material 2 flowing over and/or adjacent to the sensing system 10' such as a temperature and/or a moisture content of the material 2, for example.

In certain embodiments, the sensor 102' may be in electrical communication with a controller 108' of the sensing system 10'. A junction box or component (not depicted) may be employed to facilitate the electrical communication between the sensor 102' and the controller 108'. Although the sensor 102' shown in FIG. 10 may be directly wired to the controller 108', it is understood that the sensor 102' may be in wireless communication with the controller 108' if desired. The controller 108' may be any type of controller 108' such as a microcontroller including a processor, for example. In one embodiment, the controller 108' may be configured to receive and process the signal from the sensor 102'. The controller 108' may also be configured to communicate and/or transmit to a user at least one desired output such as the parameters of the flow member 80' and/or the material 2 flowing over and/or adjacent to the sensing system 10' (e.g. the movement and/or the rotational speed of the flow member 80'), outputs determined from the parameters of the flow member 80' and/or the material 2 flowing over and/or adjacent to the sensing system 10' (e.g. the flow and/or the flow rate of the material 2 flowing over and/or adjacent to the sensing system 10'), or any combination thereof, for example. Various means of communication may be employed by the controller 108' such as electronic, visual, and/or haptic communication, for example. In some embodiments, the controller 108' may be configured to communicate with an electric device of the user (i.e. a smartphone) to provide the at least one desired output to the user.

During operation of certain embodiments, the stream of material 2 flows over the flow member 80' causing it to rotate within the housing 12'. As the flow member 80' rotates, a position of the sensing elements 100' in relation to the sensor 102' changes, essentially moving closer and away from the sensor 102', which affects the electromagnetic field provided by the sensor 102'. The sensor 102' detects and/or measures the change in the electromagnetic field, which is indicative of the at least one parameter of the flow member 80' and/or the material 2 flowing over and/or adjacent to the sensing system 10'. The sensor 102' then generates and transmits a signal representative of the at least one parameter of the flow member 80' and/or the material 2 flowing over and/or adjacent to the sensing system 10' to the controller 108'. Using the signal received from the sensor 102', the controller 108' obtains the movement and/or the rotational speed of the flow member 80', which is then used to determine at least one desired output (e.g. the movement and/or flow rate of the material 2 flowing over and/or adjacent to the sensing system 10'). The controller 108' then communicates and/or transmits the at least one desired output to the user.

The sensing systems 10, 10' may be configured for an agricultural bulk material such as grain, for example. Grain includes, but is not limited to, coarse grains (corn, sorghum); cereal grains (wheat, durum, oats, barley, rice); small grains (canola, flax, mustard), pulses (lentils, peas, edible beans); oilseeds (soybeans, sunflower), and the like. It should be appreciated that the sensing systems 10, 10' may have applications in commercial, industrial, military, and other various industries.

As illustrated in FIG. 11, the sensing systems 10, 10' may be employed in a grain handling system 200 to monitor a flow of the material 2 (e.g. grain) therein. In certain embodiments, the grain handling system 200 may be a grain dryer system. However, it is understood that the sensing systems 10, 10' may be employed in any type of grain handling system 200 as desired. The grain handling system 200 may include a "wet" grain holding bin 202 having a loading feeder (not depicted), a grain enclosure 204 (e.g. a grain column) surrounding a heated air plenum section 206 and a cooling air plenum section 208, and a "dry" grain discharge mover 210. In certain embodiments, the sensing systems 10, 10' may be disposed entirely within the grain enclosure 204. In other embodiments, the sensing systems 10, 10' may be disposed partially outside of the grain enclosure 204. More preferably, the sensing systems 10, 10' may be disposed at least partially in the grain enclosure 204 in close proximity to the grain discharge mover 210 to ensure that the grain is freely moving through an entirety of the grain enclosure 204 from the loading feeder to the grain discharge mover 210. It is understood, however, that the sensing system 10 may be positioned at any suitable location in the grain handling system 200 as desired.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A sensing system for a material handling system, comprising:
    a housing configured to be coupled to a structure for receiving a flow of a material, wherein the housing includes a first opening and a second opening formed therein, and wherein the second opening is configured to permit the material in the housing to return back to the structure and into the flow of the material; and
    a sensor assembly including a flow member disposed in the housing and a sensor disposed in the housing adjacent the flow member, wherein the sensor is configured to monitor the flow member in the housing, wherein a portion of the flow member extends through the first opening of the housing into the structure adjacent the flow of the material and the sensor is configured to detect at least one parameter of at least one of the flow member and the flow of the material.

2. The sensing system of claim 1, wherein the flow member includes at least one sensing element coupled thereto.

3. The sensing system of claim 2, wherein the at least one sensing element is produced from a metal material.

4. The sensing system of claim 1, wherein the at least one parameter of the flow member is at least one of a movement and a rotational speed of the flow member.

5. The sensing system of claim 1, wherein the at least one desired output is at least one of a flow and a flow rate of the material flow.

6. The sensing system of claim 1, wherein the sensor is an electromagnetic sensor.

7. The sensing system of claim 6, wherein the electromagnetic sensor detects a change in an electromagnetic field resulting from a change in a position of at least one sensing element coupled to the flow member in relation to the electromagnetic sensor.

8. A sensing system for a grain handling system, comprising:
   a housing configured to be coupled to a structure for receiving a flow of grain, wherein the housing includes a first opening and a second opening formed therein, and wherein the second opening is configured to permit grain in the housing to return back to the structure and into the flow of grain; and
   a sensor assembly including a flow member disposed in the housing and a sensor disposed in the housing adjacent the flow member, wherein the sensor is configured to monitor the flow member in the housing, wherein a portion of the flow member extends through the first opening of the housing into the structure adjacent the flow of grain and the sensor is configured to detect at least one parameter of at least one of the flow member and the flow of grain.

9. The sensing system of claim 8, wherein the housing is formed by an upper wall, a lower wall, a front wall, a first side wall, and a second side wall, wherein the lower wall is positioned at an angle with respect to a plane defined by the upper wall.

10. The sensing system of claim 8, wherein the housing includes at least one protuberance configured to direct at least a portion of the flow of grain to flow at least one of over and adjacent at least a portion of the flow member.

11. The sensing system of claim 8, wherein the housing includes at least one protuberance configured to decrease a pressure surrounding the housing to draw out grain collected in the housing.

12. The sensing system of claim 8, wherein the flow member is rotatably coupled to the housing.

13. The sensing system of claim 8, wherein the sensor assembly further includes at least one sensing element coupled to the flow member.

14. The sensing system of claim 8, wherein the at least one parameter of the flow member is at least one of a movement and a rotational speed of the flow member.

15. The sensing system of claim 8, wherein the at least one desired output is at least one of a flow and a flow rate of the flow of grain.

16. A method of detecting a material flow, comprising:
   providing a sensing system including:
      a housing configured to be coupled to a structure for receiving the material flow, wherein the housing includes a first opening and a second opening formed therein, and wherein the second opening is configured to permit a material in the housing to return back to the structure and into the material flow;
      a sensor assembly at least partially disposed in the housing, wherein the sensor assembly includes a flow member disposed in the housing and a sensor disposed in the housing adjacent the flow member, wherein the sensor is configured to monitor the flow member in the housing, and wherein a portion of the flow member extends through the first opening of the housing into the structure adjacent the material flow; and
      a controller in communication with the sensor assembly;
   detecting, via the electromagnetic sensor, at least one parameter of at least one of the flow member and the material flow; and
   determining, via the controller, at least one desired output based upon the at least one parameter.

17. The method of claim 16, further comprising transmitting the at least one used desired output to a user.

18. The method of claim 16, wherein the at least one parameter is at least one of a movement and a rotational speed of the flow member.

19. The method of claim 16, wherein the at least one desired output is at least one of a flow and a flow rate of the material flow.

* * * * *